United States Patent [19]

Kessmar

[11] 3,955,442

[45] May 11, 1976

[54] TRANSFER CASE WITH GEAR AND CHAIN DRIVE

[75] Inventor: Leo R. Kessmar, Northwood, Ohio

[73] Assignee: Dana Corporation, Toledo, Ohio

[22] Filed: Feb. 28, 1975

[21] Appl. No.: 554,271

[52] U.S. Cl. .............................. 74/665 GE; 74/701
[51] Int. Cl.² ........................................ F16H 37/06
[58] Field of Search ............... 74/665 GE, 701, 710, 74/710.5, 665 Q, 711

[56] References Cited
UNITED STATES PATENTS

| | | | |
|---|---|---|---|
| 2,203,282 | 6/1940 | Keese | 74/701 |
| 2,760,385 | 8/1956 | Fuchs | 74/665 Q X |

Primary Examiner—Samuel Scott
Assistant Examiner—Frank H. McKenzie, Jr.
Attorney, Agent, or Firm—Robert E. Pollock

[57] ABSTRACT

A plural power path torque transfer mechanism for incorporation in a four-wheel drive vehicle between a source of input torque and a pair of front and rear drive axle assemblies. The torque transfer mechanism includes a housing having an input shaft connected to the source of input torque and a pair of spaced output shafts each adapted to be connected to one of the axle assemblies. Plural power paths are established between the input and output shafts by selectively engaging either a gear drive unit or a chain drive unit.

11 Claims, 1 Drawing Figure

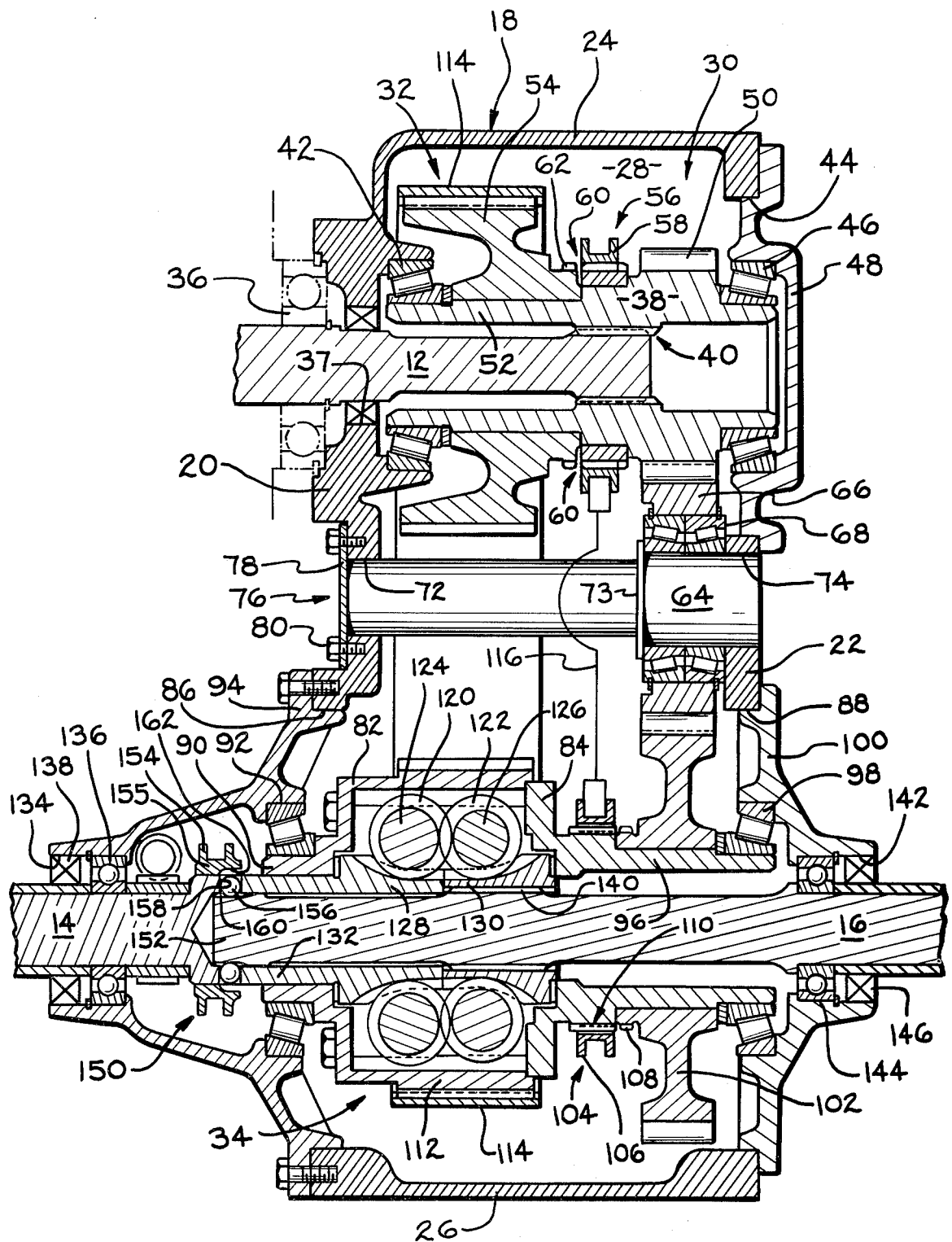

TRANSFER CASE WITH GEAR AND CHAIN DRIVE

BACKGROUND OF THE INVENTION

The present invention relates to four-wheel drive vehicles in general and more particularly to a plural path torque transfer mechanism for such a vehicle.

It is well known in the art that the tractive effort of a vehicle is substantially improved if driving torque is applied to both front and rear axles. This concept has long been used in military and off-highway vehicles by providing a torque transfer mechanism between the axles. The torque transfer mechanism includes means for receiving torque from a prime mover and delivering this torque to the axles.

Four-wheel drive systems of this general type are known which provide a plurality of power paths through the torque transfer mechanism. In one instance this has been accomplished through the use of a pair of chain drive power paths, such as shown in U.S. Pat. No. 830,642 issued Sept. 11, 1906 to Chaquette. Another accomplishes this result by employing a pair of gear drive power paths such as shown in U.S. Pat. No. 2,203,282 issued to Keese, June 4, 1940.

While these arrangements have provided the desired plural power paths for a four-wheel drive vehicle, each unit involves certain compromises in size, ruggedness and quietness limiting their appeal. In particular the prior art devices have been either all chain drive or all gear drive resulting in large overall units and relatively noisy high speed operation respectively. In addition the construction details of the known prior art are not suited to ready manufacture.

It is, therefore an object of the present invention to substantially eliminate the compromises which have existed for decades in four wheel drive transfer case design.

Another object of the present invention is to provide a torque transfer mechanism wherein the housing is designed in such a manner as to permit the drive units to be pre-assembled and easily and conveniently mounted within the housing as subassemblies.

A further object of this invention is to provide a simple control system for selecting the desired power path through the torque transfer mechanism.

Still another object is to provide an improved mounting arrangement for the input and output means of the torque transfer mechanism which will prevent undesirable operation of the various parts under different load applications.

SUMMARY OF THE INVENTION

The above and further objects are provided in an improved torque transfer mechanism wherein the plural power paths are established in a more desirable and economical manner than heretofore possible. This is accomplished through the combination of a gear drive unit for achieving a low speed power path when relatively high torque is required and a chain drive unit to establish a high speed power path when quieter operation is more desirable and only relatively low torque is required.

DESCRIPTION OF THE DRAWING

The single FIGURE of the drawing is a cross-sectional side elevational view of the torque transfer mechanism incorporating the features of the present invention.

DESCRIPTION OF THE PREFERRED EMBODIMENT

Referring to the single FIGURE of the drawing, a torque transfer mechanism 10 is shown which is connected by an input shaft 12 to a transmission (now shown) and adapted to transmit torque therefrom to a front axle assembly (not shown) through a front output shaft 14 and to a rear axle assembly (not shown) through a rear output shaft 16. The transmission is connected to a conventional prime mover while the axle assemblies are adapted to drive the usual pairs of traction wheels.

The torque transfer mechanism 10 includes a housing 18 which is substantially rectangular in shape and has spaced parallel front and rear side walls 20 and 22 and top and bottom walls 24 and 26 respectively. The walls form a hollow enclosure 28 for receiving the drive means of the present invention which are here shown generally as a gear drive unit 30 and a chain drive unit 32.

In the preferred embodiment, the torque transfer mechanism 10 is shown having the output end of the gear and chain drive units 30 and 32 adapted to deliver torque to a conventional type differential mechanism 34 which serves to differentially connect the axially aligned output shafts 14 and 16. It should be noted that the present invention is not limited to use in such an arrangement but is also applicable to a design not requiring a differential mechanism. In the latter arrangement, it is possible to rotatably support the output end of each unit on a common shaft and provide conventional clutch means to selectively lock one or the other of the units to the shaft. In addition, while the input end of the gear and drive units 30 and 32 are shown as being fixed for rotation with and selectively connectable to the input shaft respectively, it will be noted that other types of connections can be made without departing from the spirit and scope of the present invention. One such arrangement would be to have the input end of each unit directly connected to and rotatable with the input shaft 12.

Referring now specifically to the preferred embodiment, the input shaft 12, driven by transmission, is shown journalled for rotation in a bearing assembly 36 which is carried in a vertically extending upper portion of front wall 20. The input shaft 12 passes through an opening 37 in the front wall 20 and extends into the interior of the upper portion of the enclosure 28 terminating substantially midway between the front wall 20 and rear wall 22. The input shaft 12 extends into and is fixed for rotation with tubular longitudinally extending drive member 38 by means of a spline connection shown generally at 40. The drive member 38 has its opposite ends in alignment with the side walls 20 and 22 and has its front end journalled for rotation in a bearing assembly 42 which is carried in the front wall 20. The opposite end of the drive member 38 extends partially through an opening 44 in the rear wall 22 and is journalled for rotation in a bearing assembly 46 supported in a cover plate 48 piloted in the opening 44 so as to be carried in the rear wall 22.

The drive member 38 is constructed with an integral small diameter drive gear 50 located adjacent the rear wall 22 and an axially extending reduced diameter hub 52. The hub 52 extends toward the front wall 20 and serves as a support means for a relatively rotatable large diameter drive sprocket 54. The drive gear 50 is constantly driven with the input shaft 12 through the spline connection 40 while the drive sprocket 54 is selectively coupled to the input shaft 12 by an input clutch mechanism 56. The input clutch mechanism 56 is located intermediate the drive gear 50 and drive sprocket 54 and includes a shiftable clutch collar 58 which is constantly driven with the drive member 38 by means of mating longitudinal splines 60. The collor 58 is axially shiftable relative to the drive member 38 for selective engagement with an annular series of clutch teeth 62 integral with the drive sprocket 54. In the position shown, the clutch collar is neutralized and can be axially shifted in either direction, normally in unison with lower clutch 106 as will be described in more detail hereinafter. Shifting to the right along the splines 60 will produce no effect through the collar 58. Shifting to the left from neutral will result in meshing engagement of the internal splines on the collar 58 with the external clutch teeth 62 on the drive sprocket 54. With the completion of this shift, the drive sprocket 54 is directly connected to the input shaft 12 and rotatable therewith.

Located in the intermediate portion of the enclosure 28 and spaced below the input shaft 12 in parallel relation thereto is a longitudinally extending idler shaft 64. An idler gear 66 is supported on the idler shaft 64, by a double bearing assembly 68 which is held in place by a snap ring 73 on one side and abuts the rear wall 22. As seen, the opposite ends of the idler shaft 64 are supported in aligned openings 72 and 74 provided in front and rear walls 20 and 22 respectively. The right end of the idler shaft 64 has a pilot fit with the opening 74 of the rear wall 24 while the left end is provided with a pre-loaded connection 76 which serves to constantly load the shaft 64 toward the rear wall 22. Pre-load is accomplished by means of a bowed strap 78 which has end portions sufficiently elongated so as to overlap the opening 72 on opposite sides thereof. Fastening means, here shown as bolts 80, pass through suitable openings in the overlapped ends and serve to secure this strap 78 to the front wall 20.

Suitably mounted in the lower portion of the enclosure 28 is the differential mechanism 34 which is adapted to receive torque from the input shaft 12 and through either the drive gear 50 or drive sprocket 54 and distributed the same to the output shafts 14 and 16.

The differential mechanism 34 can be of any conventional type and in a preferred embodiment as illustrated is of a worm gear type similar to that shown and described in U.S. Pat. No. 1,373,657 which issued Apr. 5, 1921 to J. A. Finefrock, the disclosure thereof being incorporated herein by reference.

In this particular design, the differential mechanism 34 is constructed of a two-piece case consisting of a main housing portion 82 and a closure portion 84 secured together in a well known manner to provide a rigid structure for supporting therein the differential gear train.

The differential mechanism 34 is mounted within the lower portion of the housing 18 between aligned openings 86 and 88 provided in front and rear walls 20 and 22 respectively. For this purpose, the left end of the housing 82 has a short tubular hub 90 journalled for rotation in a bearing assembly 92 supported in a bearing adapted 94 piloted in opening 86 and secured to the front wall 20. The right end of the differential mechanism 34 is supported with respect to the rear wall 22 by means of a tubular axial extension 96 integrally formed on the right side of the closure 84. As illustrated, the outer end of the extension 96 is journalled for rotation in a bearing assembly 98 supported in a bearing adapter 100 piloted in the opening 88 and secured to the rear wall 22.

A reduced diameter portion is formed on the extension 96, adjacent the bearing assembly 98, for rotatably mounting a large diameter driven gear 102. The gear 102 is aligned with and in constant meshing engagement with the idler gear 66. So that rotation of the drive gear 50 by the input shaft 12 will cause rotation of the driven gear 102 relative to the extension 96. In order to connect the driven gear 102 to the differential mechanism 34 so that torque is directed to the output 14 and 16 through this gear train, an output clutch mechanism 104 is positioned between the closure 84 and the driven gear 102. The clutch mechanism 104 consists of an axially shiftable clutch collar 106 rotatable with the extension 96 and an annular series of clutch teeth 108 integral with the adjacent portion of the driven gear 102. Mating longitudinal splines 110 provide a constant driving connection between the extension 96 and the clutch collar 106. The collar 106 is shown in the neutral position and, when shifted to the right, will establish a low speed ratio by forming a driving connection between the differential mechanism 34 and driven gear 102. This ratio is established as the internal splines of the collar 106 slide axially into meshing engagement with the complemental clutch teeth 108 on the driven gear 102 to lock the gear 102 directly to the differential mechanism 34. Shifting in the opposite direction toward the enclosure 84 will result in relative sliding movement of the collar 106 with respect to the extension 84 with no drive effect occurring between gear 102 and the differential 34.

Drive is transmitted to the differential mechanism 34 in high speed ratio by means of a small diameter driven sprocket 112, here shown as being integrally formed on the periphery of the main housing 82. The driven sprocket is aligned with the drive sprocket 54 and a continuous chain 114 surrounds the sprockets to form a constant driving connection therebetween. In the preferred embodiment, the driven sprocket 112 is shown as an integral part of the housing 82. If desired, a separate sprocket can be rotatably supported on the housing 82 by suitable bearing means. In such an instance mating clutch teeth, similar to clutch teeth 108 on driven gear 102, can be provided on the separate sprocket so that the clutch collar 106 can be used to connect the sprocket to the housing 82 when shifted in one direction from neutral and connect the driven gear 102 to the extension 96 when shifted in the opposite direction from neutral.

Operating means in the form of a single control member 116 is suitably supported in the housing 18 at a convenient location to enable an operator to actuate the input and output clutch mechanisms 56 and 104 so that the desired speed ratio can be obtained. The control member 116 is shown schematically and can be any conventional type of shift mechanism which will engage the collars 58 and 106 in a manner to move the same simultaneously in opposite directions from the neutral position shown.

If it is desired to transmit torque from the input shaft 12 to the output shafts 14 and 16 in the low speed ratio, the control member 116 is actuated so that both collars 58 and 106 slide axially to the right toward the drive and driven gears 50 and 102. This movement allows the upper collar 58 to be carried to the right along the drive member 38 with no effect while the lower collar 106 slides to the right along the splines 100 into meshing engagement with the clutch teeth 108 on driven gear 102. Thus drive torque passes from the input shaft 12 to drive member 38 and in turn down through the constant mesh gearing 50, 66 and 102 to the differential mechanism 34 out to the output shafts 14 and 16 in the low speed ratio.

High speed ratio is obtained by actuating the control member 116 so that both collars 58 and 106 will be shifted axially to the left toward the drive and driven sprockets 54 and 112. Such movement serves to carry the upper collar 58 axially along the mating splines 60 and into meshing engagement with the clutch teeth 62 on the drive sprocket 54 while the lower collar 106 will produce no effect. By this operation the drive sprocket 54 is connected directly to the drive member 38 and drive torque will flow from the input shaft 12 to the drive member 38 where it then passes to the drive sprocket 54 and down to the driven sprocket 112 by means of the chain 114, and to the differential mechanism 34. From the differential mechanism 34, the differential gearing therein distributes the torque to the output shafts 14 and 16 in the high speed ratio.

Referring in greater detail to the diferential mechanism 34 the gear train therein for differentially connecting the input and output shafts 14 and 16 is shown consisting of a plurality of sets of gear sets 120 and 122 (pinions) are rotatably supported on pins 124 and 126 carried by the housing 82. Each of gear sets 120 and 122 comprise a central worm gear with a spur gear at both ends thereof, the corresponding spur gears of the two sets being in driving engagement as shown more fully in the aforementioned Finefrock patent. A pair of worm gears 128 and 130 (side gears) are provided, each being in constant meshing engagement with one of the worm gears of gear sets 120 and 122. The worm gears 128 and 130 are positively connected to front and rear output shafts 14 and 16 respectively so that any torque delivered to the differential mechanism 34 will, through the meshing gear train, differentially transmit this torque out through the output shafts 14 and 16. Worm gear 128 is connected to the front output shaft 14 by an axially extending tubular portion 132 which extends out through the hub 90 of the differential housing 82. The worm gear 128, tubular portion 132 and output shaft 14 form an integral construction with the output shaft 14 extending out through a central opening 134 in the bearing adapter 94 so as to be drivingly coupled to the front axle assembly (not shown). A conventional bearing assembly 136 and seal assembly 138 are provided within the opening 134 to rotatably mount the output shaft 14 with respect to the bearing adapter 94 and sealingly close the outer end thereof.

Worm gear 130 is drivingly connected to the rear output shaft 16 by means of a spline connection 140. From this spline connection the left end of the output shaft 14 is constructed so as to pass through the central portion of the worm gear 128 and extend into the tubular portion 132 thereof while the right end is adapted to pass through the central portion of the extension 96 and out a central opening 142 in the bearing adapter 100 and is drivingly coupled to the front axle assembly (not shown).

A conventional bearing assembly 144 and seal assembly 146 rotatably mounts the right end of the rear output shaft 16 within the opening 142 and sealingly close the outer end thereof.

Means is provided to render the differential gearing ineffective when it is desired to drive both axle assemblies directly through the differential mechanism 34. This condition is desirable when the vehicle is traversing muddy, slippery or otherwise difficult terrain. To achieve this operation in the preferred embodiment, a lock-up mechanism shown generally at 150, is located within an axial extension of the bearing adapter 94 and is shown operatively associated with the tubular portion 132, which is an integral part of the front output shaft 14, and the inner end 152 of the rear output shaft 16.

The lock-up mechanism 150 is operative to directly interconnect the front and rear output shafts 14 and 16 together whereby the worm gears 128 and 130 associated therewith and the meshing gears 120 and 122 will all be locked with respect to the main housing 82 of the differential mechanism 34.

More specifically, the lock-up mechanism 150 consists of a selectively shiftable collar 154 which has a pilot portion 155 slidably disposed about the tubular portion 132 to the left of the hub 90 and a plurality of drive balls 156 loosely guided in a similar number of radial pockets 158 provided in the tubular portion 132. The drive balls 156 are adapted to selectively cooperate with short longitudinally extending flutes 160 formed on the end 152 of the rear output shaft 16. As seen, the flutes 160 are aligned with the drive balls 156 and in the position shown, i.e., with the collar 154 positioned to the left of the openings 158, the balls 156 are aligned with an annular relief 162 provided on the interior surface of the collar 152 on the right end thereof. With the parts in this position and torque being applied to the output shafts 14 16, centrifugal force will displace the drive balls 156 radially outwardly into cooperation with the annular relief 162. The outward movement of the drive balls 156 is sufficient to displace the balls out of contact with the flutes 160 so that relative rotation can occur between the output shafts 14 and 16 through the differential gears.

In order to nullify the effect of the differential gear train when unwarrranted conditions require, as mentioned above, the operator actuates a suitable control member (not shown) which will cause the pilot portion collar 154 to slide along the tubular portion 132 until the drive balls 156 are cammed radially inwardly into engagement with the flutes 160 on the end 152 of the rear output shaft 16 by the pilot portion 155. The drive balls 154 are thus retained in this position by the pilot portion 155 thereby maintaining the front and rear output shafts 14 and 16 locked together so that both the front and rear axle assemblies are positively driven.

From the foregoing description it will be seen that each drive unit 30 and 32 consists of a drive and driven portion. The drive portion of each unit is operatively associated with the input shaft 14 and the driven portion is operatively associated with the aligned output shafts 14 and 16.

Further, certain manufacturing and assembly operations have been simplified by constructing the housing 18 in the manner shown. By means of the rectangular configuration of the housing 18, manufacturing has been improved since it is possible to take a series of such housings and position the same and straddle mill the flat bearing receiving surfaces of the front and rear walls 20 and 22. This type of operation lends itself ideally to a production line process which results in a substantial time and cost savings.

Assembly conditions are greatly improved in the present design since both the drive and driven portions of the torque transfer mechanism 10 can be pre-assembled so that they can be either shipped separately for replacement purposes or more conveniently assembled within the housing 18 at final assembly.

In the preferred embodiment, the separate input and output sub-assemblies are provided by constructing the drive member 38 and the differential mechanism 34 in the manner shown. The input sub-assembly comprises the drive member 38, integral drive gear, input clutch mechanism 56 and the drive sprocket 54 rotatably carried on the hub 52 of the drive member 38. The opening 44 in the rear wall 22 is of sufficient size to permit free passage therethrough of the larger diameter drive sprocket 54. Making up the output sub-assembly is the differential mechanism 34, which includes the driven sprocket 112 and the integral extension 96 formed on the closure 84 and the output clutch mechanism 104 and driven gear 102 supported on the extension 96. Both aligned openings 86 and 88 in the front and rear walls 20 and 22 respectively are of a diameter great enough to allow passage of the larger diameter driven gear 102 therethrough.

Resulting from the above mentioned construction of the drive member 38 and differential mechanism 34 still another improved arrangement results. It will be seen that both the drive member 38 and differential mechanism 34 extend substantially the full width of the housing 18 and have their opposite ends supported in substantial alignment with the front and rear walls 20 and 22. With this type of construction, the tendency for cocking of the drive and driven members under sudden or high torque applications is completely eliminated.

Finally, the most desirable conditions have been achieved by combining a gear drive to provide low speeds for power torque applications and provide a chain drive for silent torque application at high speeds.

Thus a four-wheel-drive transfer case has been provided having two speeds obtainable through the combination of two distinct types of drive arrangements which are drivingly connected to a differential unit in such a manner as to allow differentiation to take place between the front and rear driving axles and also allow both axles to be locked together as a solid shaft.

While various features of the invention have been shown and described it will be obvious to one skilled in the art that various modifications may be made therein without departing from the scope of the invention as defined in the following claims.

The embodiments of the invention in which an exclusive property or privilege is claimed are defined as follows:

1. A torque transfer mechanism having a high and low speed power path comprising:
   a. an input shaft;
   b. an output shaft spaced from said input shaft;
   c. a gear unit connecting said input and output shafts for establishing the low speed power path including a drive gear connected to said input shaft and driven gear drivingly connected to said drive gear and rotatably supported on said output shaft and having clutch means thereon;
   d. a chain drive unit connecting said input and output shafts for establishing the high speed power path including a drive sprocket drivingly connected to said input shaft and a driven sprocket drivingly connected to said drive sprocket and rotatably supported on said output shaft and having clutch means thereon; and
   e. shiftable means carried on said output shaft being movable into selective engagement with said clutch means on said driven gear to connect said driven gear to said output shaft and into engagement with said clutch means on said driven sprocket to connect said driven sprocket to said output shaft.

2. A torque transfer mechanism comprising:
   a. an input shaft;
   b. output means spaced from said input shaft;
   c. a torque transmitting gear unit having a drive gear drivingly connected to said input shaft and a driven gear in constant driving engagement with said drive gear and rotatably supported on said output means;
   d. a torque transmitting chain drive unit having a drive sprocket drivingly connected to said input shaft and a driven sprocket in constant driving engagement with said drive sprocket and rotatably supported on said output means;
   e. operating means connected to said output shaft for rotation therewith and shiftable relative thereto in a first position to connect said driven gear to said output means for establishing a low speed power path between said input shaft and said output means and in a second position to connect said driven sprocket to said output means for establishing a high speed power path between said input shaft and said output means.

3. A torque transfer mechanism according to claim 2 wherein said output means includes a pair of axially aligned output shafts and a differential mechanism connecting said output shafts.

4. A torque transfer mechanism according to claim 3 wherein one of said driven gear and driven sprocket is connected to said differential mechanism and said other is rotatably supported thereon.

5. A torque transfer mechanism according to claim 4 wherein said operating means includes an output clutch collar connected to said differential mechanism and said other of said driven gear and driven sprocket has clutch means selectively engageable by said output clutch collar.

6. A torque transfer mechanism according to claim 5 wherein said operating means further includes an input clutch collar connected to said drive gear and said drive sprocket is rotatably supported on said drive gear and has clutch means thereon selectively engageable by said input clutch collar.

7. A torque transfer mechanism according to claim 6 wherein a single control member interconnects said input and output clutch collars.

8. A torque transfer mechanism according to claim 3 wherein a lock-up mechanism is provided for said aligned output shafts including a shiftable collar having cam means and supported on one of said shafts, said one shaft having a plurality of balls guided therein and said other shaft having a plurality of flutes engageable with said balls upon engagement of said cam means with said balls in response to shifting of said collar.

9. A torque transfer mechanism comprising; a rotatable torque input shaft; a pair of axially aligned torque receiving output shafts spaced from said input shaft; drive means associated with said input shaft including a drive gear drivingly connected to said input shaft, a drive sprocket rotatably supported on said drive gear and input clutch means drivingly connected to said drive gear and engageable with said drive sprocket to lock said drive sprocket to said drive gear; driven means associated with said output shafts including a differential mechanism having a case and differential gearing therein connecting said output shafts, a driven gear rotatably supported on said casing and constantly driven by said drive gear, a driven sprocket drivingly connected to said case and output clutch means drivingly connected to said case and selectively engageable with said driven gear to lock said driven gear to said case; and a single control member connecting said input and output clutch means for simultaneous movement and having a neutral and opposite first and second operative positions.

10. A torque transfer mechanism according to claim 9 wherein an idler gear drivingly connects said drive and driven gears and a chain drivingly connects said drive and driven sprockets.

11. A torque transfer mechanism comprising: a housing having front and rear side walls; a rotatable torque input shaft extending into housing; a pair of aligned rotatable torque receiving output shafts in said housing spaced from said input shaft and extending out said front and rear walls; a drive gear disposed about and drivingly connected to said input shaft and having opposite ends rotatably supported in said side walls; a drive sprocket rotatably supported on said drive gear and having clutch means thereon; an input clutch collar constantly driven by said drive gear and shiftable in a first direction relative thereto into selective clutching engagement with said clutch means on said drive sprocket; a differential mechanism including a case disposed about said output shafts having opposite ends rotatably supported in said front and rear walls and having differential gearing therein interconnecting said output shafts; a driven gear rotatably supported on said case and having clutch means thereon; a driven sprocket drivingly connected to said case; an output clutch collar constantly driven by said case and shiftable relative thereto in a second direction into clutching engagement with said clutch means on said driven gear; an idler gear interconnecting said drive and driven gear in constant meshing engagement; a chain drivingly connecting said drive and driven sprockets; and a single control member connected to said input and output clutch collars having a neutral and a first and second operative position and operable in said first operative position to shift said output clutch collar into clutching engagement with said clutch means on said driven gear and in said second operative position to shift said input clutch collar into clutching engagement with said clutch means on said drive sprocket.

* * * * *